(12) United States Patent
Jarl

(10) Patent No.: US 9,301,671 B2
(45) Date of Patent: Apr. 5, 2016

(54) DISH RACK

(75) Inventor: Christopher Jarl, Motala (SE)

(73) Assignee: J GRUPPEN AB, Motala (SE)

( * ) Notice: Subject to any disclaimer, the term of this patent is extended or adjusted under 35 U.S.C. 154(b) by 0 days.

(21) Appl. No.: 14/423,338

(22) PCT Filed: Aug. 23, 2012

(86) PCT No.: PCT/SE2012/050897
§ 371 (c)(1),
(2), (4) Date: Jun. 22, 2015

(87) PCT Pub. No.: WO2014/046574
PCT Pub. Date: Mar. 27, 2014

(65) Prior Publication Data
US 2015/0305594 A1     Oct. 29, 2015

(51) Int. Cl.
*A47G 19/08* (2006.01)
*A47L 19/04* (2006.01)
(Continued)

(52) U.S. Cl.
CPC ............... *A47L 19/04* (2013.01); *A47B 46/00* (2013.01); *A47B 77/02* (2013.01); *A47B 81/04* (2013.01); *A47B 43/00* (2013.01); *A47F 5/0892* (2013.01); *A47J 47/16* (2013.01)

(58) Field of Classification Search
CPC ........ A47B 81/04; A47B 46/00; A47B 77/02; A47B 43/00; A47B 2088/0448; A47B 77/14; A47B 61/003; A47B 57/04; A47L 19/04; A47J 47/16; A47F 5/0892
USPC ......... 211/41.1–41.9, 113, 115–119, 149, 85, 211/195, 126.15, 85.29, 96, 150; 312/246, 312/248, 323, 331; 108/93, 102, 138; 248/202.1, 242, 298.1
See application file for complete search history.

(56) References Cited

U.S. PATENT DOCUMENTS

| 1,104,004 A | * | 7/1914 | Rathbone | ................. A24F 9/14 |
| | | | | 131/257 |
| 1,619,259 A | * | 3/1927 | Jarvis | ....................... A47F 5/13 |
| | | | | 211/181.1 |

(Continued)

FOREIGN PATENT DOCUMENTS

| DE | 20117571 U1 | 1/2002 |
| IL | 101463 A | 3/1995 |

(Continued)

OTHER PUBLICATIONS

PCT/ISA/210'International Search Report—May 22, 2013 (Issued in Counterpart Application No. PCT/SE2012/050897).

*Primary Examiner* — Joshua J Michener
*Assistant Examiner* — Devin Barnett
(74) *Attorney, Agent, or Firm* — Venable LLP; Eric J. Franklin

(57) ABSTRACT

A dish rack including a cassette intended to be attached to the underside of a cabinet or a shelf. The cassette is arranged, in a first position, to house a folded wire shelf that can be pulled out of and folded down from the cassette and that is arranged in at least two sections. In a second, folded-down position of the wire shelf, the cassette supports the rear edge of a first section of the wire shelf so that the first section hangs down at a first predetermined angle relative to the underside of the cabinet/shelf, and a second section of the wire shelf rotatably connected to the first section at the front edge thereof and capable of being folded outwards from the first section so that the second section, in a folded-out state, forms an angle with the upper side of said first section by a second predetermined angle.

10 Claims, 5 Drawing Sheets

(51) Int. Cl.
*A47B 81/04* (2006.01)
*A47B 46/00* (2006.01)
*A47B 77/02* (2006.01)
*A47F 5/08* (2006.01)
*A47J 47/16* (2006.01)
*A47B 43/00* (2006.01)

(56) References Cited

U.S. PATENT DOCUMENTS

| | | | | |
|---|---|---|---|---|
| 2,010,734 A * | 8/1935 | Parker | A47J 47/16 | 211/41.2 |
| 2,562,982 A * | 8/1951 | Cieri | A47L 19/04 | 211/1.3 |
| 2,584,101 A * | 1/1952 | Stayboldt | A47B 19/06 | 108/143 |
| 2,958,424 A * | 11/1960 | Bigatti | A47L 19/00 | 211/104 |
| 2,982,420 A * | 5/1961 | Wannemacher | A47G 23/0633 | 211/74 |
| 3,025,967 A * | 3/1962 | Christophersen | A47L 19/00 | 211/41.5 |
| 3,485,544 A * | 12/1969 | Beckerman | A47B 46/005 | 312/245 |
| 3,722,964 A * | 3/1973 | Chitester | A47B 88/10 | 312/331 |
| 4,212,400 A * | 7/1980 | Buchsteiner | A47L 19/04 | 211/200 |
| 4,221,299 A * | 9/1980 | Taylor | A47L 19/04 | 211/41.6 |
| 4,328,899 A * | 5/1982 | Krusche | A47L 19/00 | 211/200 |
| 4,531,646 A * | 7/1985 | Howard | A47F 5/12 | 108/6 |
| 6,357,605 B1 * | 3/2002 | Martorella | A47L 19/04 | 211/41.5 |
| 6,405,878 B1 * | 6/2002 | Graham | A47F 7/0064 | 211/175 |
| 6,435,634 B1 * | 8/2002 | Webb | A47B 96/025 | 248/447 |
| 7,063,219 B2 * | 6/2006 | Fann | A47B 3/002 | 211/126.15 |
| 7,350,649 B1 * | 4/2008 | Martens | A47B 57/06 | 211/150 |
| 7,445,128 B2 * | 11/2008 | Kaczmarek | A47L 15/502 | 211/150 |
| 7,618,103 B2 * | 11/2009 | Kim | A47B 46/00 | 108/138 |
| 7,717,383 B2 * | 5/2010 | Russell | A47B 21/0314 | 108/138 |
| 7,748,802 B2 * | 7/2010 | Peruzzi | A47B 46/006 | 211/195 |
| 7,874,437 B2 * | 1/2011 | Jones | A47B 61/003 | 211/105.1 |
| 8,087,108 B2 * | 1/2012 | Burns | A47J 7/20 | 211/141.3 |
| 8,267,261 B2 * | 9/2012 | Vanderhoek | A01G 9/143 | 108/143 |
| 8,636,156 B2 * | 1/2014 | Malik | A47B 57/04 | 211/106 |
| 8,727,457 B2 * | 5/2014 | Marshall | A47B 88/20 | 211/184 |
| 8,851,306 B2 * | 10/2014 | Spurr | A47B 60/005 | 211/117 |
| 8,960,821 B2 * | 2/2015 | Breisacher | A47B 88/10 | 312/331 |
| 2001/0040141 A1 * | 11/2001 | Martorella | A47L 19/04 | 211/41.6 |
| 2003/0042380 A1 * | 3/2003 | Hagglund | A47B 21/0314 | 248/286.1 |
| 2005/0011845 A1 * | 1/2005 | Ernst | A47F 5/01 | 211/150 |
| 2005/0103960 A1 * | 5/2005 | Kirchhoff | A47B 21/0314 | 248/274.1 |
| 2005/0145583 A1 * | 7/2005 | Martorella | A47L 19/04 | 211/41.6 |
| 2005/0218759 A1 * | 10/2005 | Kobayashi | A47B 88/047 | 312/331 |
| 2006/0138063 A1 * | 6/2006 | Johnson | A47L 19/04 | 211/141.3 |
| 2006/0191449 A1 * | 8/2006 | Patten | A47B 46/005 | 108/138 |
| 2006/0267467 A1 * | 11/2006 | Harbison | A47B 51/00 | 312/331 |
| 2007/0151937 A1 * | 7/2007 | Gillisie | A47L 19/04 | 211/41.5 |
| 2008/0093314 A1 * | 4/2008 | Classen | A47L 15/502 | 211/41.8 |
| 2008/0283480 A1 * | 11/2008 | Segall | A47L 19/02 | 211/41.6 |
| 2010/0308615 A1 * | 12/2010 | Miles | A47B 77/10 | 296/37.8 |
| 2013/0105423 A1 * | 5/2013 | Chalifoux | A47J 47/00 | 211/41.5 |
| 2013/0270987 A1 * | 10/2013 | Kelly | A47B 88/12 | 312/331 |

FOREIGN PATENT DOCUMENTS

| | | |
|---|---|---|
| JP | 2001000382 A | 1/2001 |
| SE | 42887 B | 8/1983 |
| WO | WO-2008/104499 A1 | 9/2008 |

* cited by examiner

DISH RACK

CROSS-REFERENCE TO RELATED APPLICATIONS

The application is the national phase under 35 U.S.C. §371 of PCT/SE2012/050897 filed 23 Aug. 2012.

TECHNICAL FIELD

The present invention relates to a dish rack that is designed to be suspended under a cabinet, a shelf or the like.

PRIOR ART

In all contexts where glasses, china, pottery or other so-called dishes are washed-up or dished, such as in kitchens and laboratories, a need arises to store the dishes in some form of rack where the dishes may be stored until they dry. In the following description, the example of use will be limited, for simplicity, to kitchens. For a long time it has been the normal procedure to place a dish rack, usually in the form of a wire dish rack, on a kitchen worktop in close proximity to a sink. When the dishes in the form of plates, glasses, cups, etc. have been washed up, the dishes are then placed for drying in the dish rack, where said rack is then left standing until the dishes have dried up. Since washing-up occurs frequently in a household, the dish rack may sometimes remain standing on the sink without being removed, or is at least seldom put away. This results in the disadvantage that the dish rack occupies a work surface. To remedy this situation, there is instead sometimes used a dish shelf that may be used suspended on a wall in close proximity to the place of washing-up. It is also a common opinion that a dish rack or a dish shelf which is constantly left standing without being put away is not exactly an ornament. Another way of solving this is to arrange a dish shelf in a cabinet above a kitchen sink in the lowermost shelf in the cabinet, so that liquid running off the dishes is allowed to run through the dish shelf and down onto the sink. This is a method that has been known for a long time. With this method, the dishes may be concealed behind the cabinet doors. A disadvantage of this is that a whole, easily accessible shelf plane is occupied by the dish shelf.

Document WO2008104499 shows an example of a solution where dish racks in the form of dish shelves are hidden behind doors in a kitchen cabinet. In this case, the dish shelves are arranged in two planes. The dish shelves are also detachable.

DESCRIPTION OF THE INVENTION

The present invention relates to a dish rack that is collapsible (folding) and capable of being pulled out and intended to be suspended under a cabinet or a shelf.

The dish rack comprises a cassette intended to be attached to the underside of a cabinet or a shelf, wherein the cassette is arranged:
1) in a first position, to house a folded wire shelf that can be pulled out of and folded down from the cassette and that is arranged in at least two sections,
2) in a second, folded-down position of the wire shelf, to support the rear edge of a first section of the wire shelf, so that this first section hangs down at a first predetermined angle in relation to said underside and a second section of the wire shelf rotatably connected to the first section at the lower edge thereof and capable of being folded outwards from the first section, so that the second section, in folded-out state, makes an angle with the upper side of the first section by means of a second predetermined angle.

The cassette has two parallel sides along which sides the wire shelf may be moved. These sides are equipped with longitudinal guide rails on which a first wheel set, arranged in front of the rear edge of the wire shelf, may run.

In a preferred embodiment, said guide rails comprise racks extending along the sides of the cassette. The wheels of said wheel set are integrated with toothed wheels which cooperate with and correspond to teeth on said racks.

Along the sides of the wire shelf, at the rear edge thereof, the first section of the wire shelf is provided with at least two profiled members arranged along the direction of pulling of the wire shelf 3, said members having a backwardly-directed extension in which an axle for rear wheels is journalled and wherein said rear wheels, in a folded-down position of the wire shelf, run against an upper surface of the cassette, and an axle for said first wheel set is journalled in a front part of said profiled members.

The tilt angle of the wire shelf in a downward and forward direction is determined by the relative position between the journal of the axle for said rear wheels and the journal of the axle for the first wheel set in said profiled members.

In a folded-down position, the wire shelf may be inserted into or pulled forward in the cassette, whereby the weight of the wire shelf is absorbed by the first wheel set which downwardly loads and runs on the guide rails and by the rear wheels which upwardly load and run against the upper surface of the cassette.

When pushing in the wire shelf, at a rear end position of the wire shelf, the rear wheels pass a boss such that the wire shelf is held by the boss in its uppermost position, and that the rear wheels, when slightly pulling out the shelf, are released from the boss such that the front edge of the wire shelf falls down a short distance (or, in an alternative description, the wire shelf falls down at an angle amounting to a few degrees in relation to the upper surface of the cassette) which is determined by a clearance between the rear wheels and the upper surface of the cassette.

A torque damper with a wheel with teeth are arranged at the profiled member, so that these teeth, during the whole or at least a major part of the pulling out of the wire shelf, make contact with an arm with corresponding teeth, whereby the drop-down of the wire shelf is damped by the torque damper. This provides a soft an attractive motion during the falling movement of the wire shelf.

In one embodiment, the first and second sections of the wire shelf are provided with parallel wires, essentially aligned with one another, which run in the direction of pulling of the wire shelf.

As an alternative, instead of controlling the wire shelf by means of racks and toothed wheels to move completely perpendicular to its direction of pulling, a cable is attached to the respective ends of an axle for the first wheel set, said cable being arranged in an endless loop over rope sheaves. Resilient devices keep the cable stretched and thus prevent obliquity of the wire shelf when pulling it out or pushing it in, and the arrangement thus ensures that the wire shelf is not locked against the cassette.

The advantages of a dish rack according to the invention are several. The dish rack does not occupy any work surface, for example in a kitchen. Further, the dish rack may be simply folded together and be stored recessed in and suspended from the cassette. The dish rack occupies a very small amount of space since it is recessed in the cassette. Further, the dish rack may be easily made invisible in those cases where the cabinet or the shelf where the dish rack is fixed is provided with a strip at the lower end. Such a strip is common in kitchens and since the cassette is thin, the whole dish rack with its cassette may be hidden behind such a strip. At the front and bottom ends, the wire shelf is provided with a handle, which means that a user only needs to pull the handle behind the strip for the wire shelf to be folded down a few centimeters at its front edge, as has been described above, whereby the wire shelf becomes accessible below said strip.

DESCRIPTION OF EMBODIMENTS

In the following a number of embodiments of the invention will be described with reference to the accompanying drawings.

Figure 1:
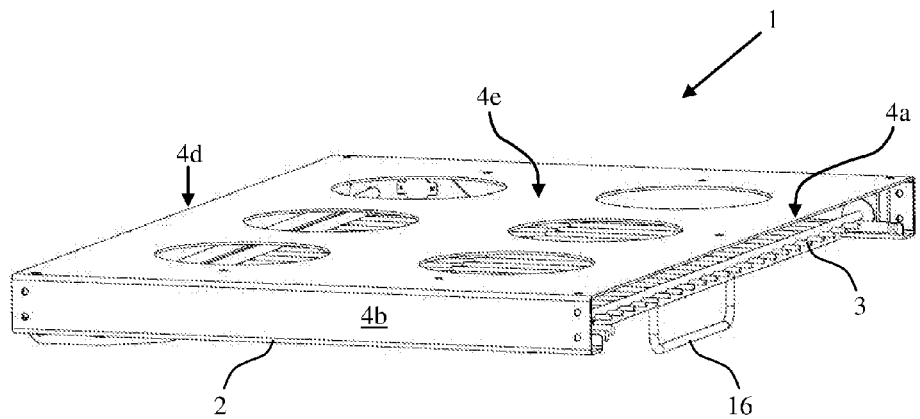
FIG. 1 shows a perspective view of the dish rack, when the wire shelf is inserted into the cassette.
Figure 2:
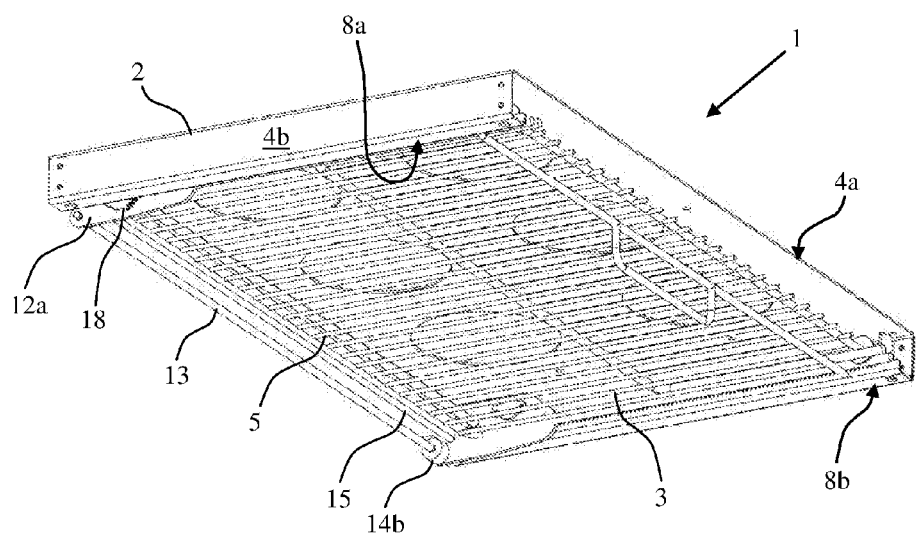
FIG. 2 shows a perspective view of the dish rack, when the wire shelf is inserted into the cassette, the dish rack in this view being illustrated from the underside of the dish rack.
Figure 3:
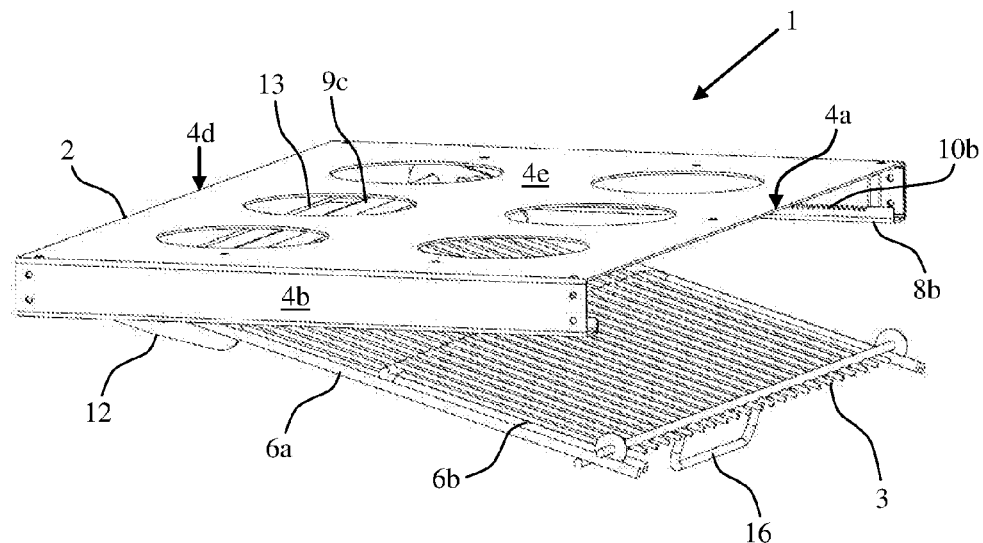
FIG. 3 illustrates the dish rack when the wire shelf is somewhat pulled out of the cassette and is about to be folded downward.
Figure 4:
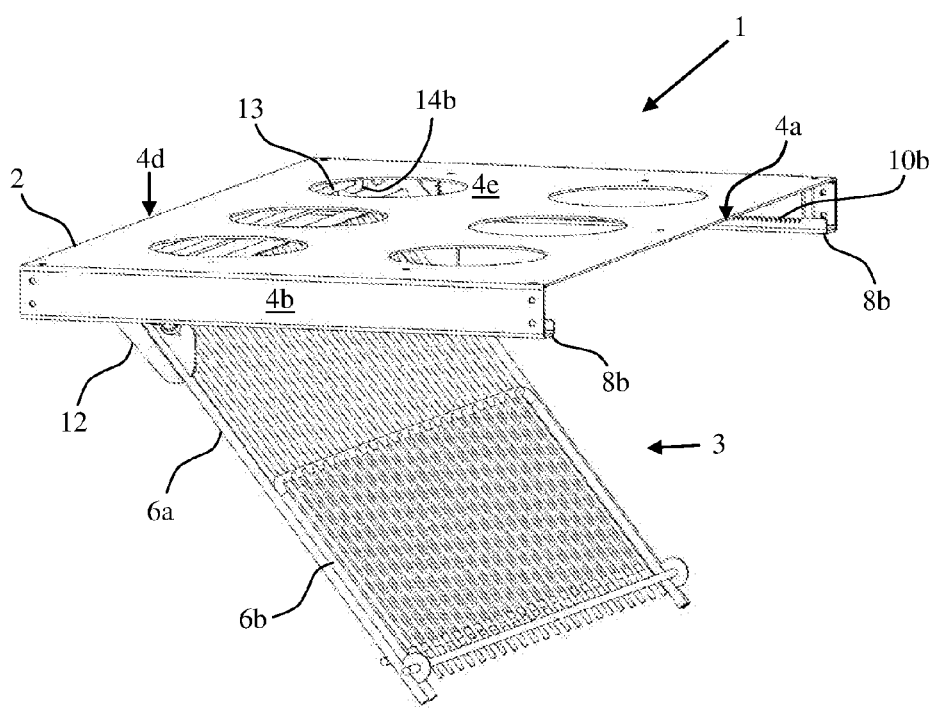
FIG. 4 shows the dish rack when the wire shelf is completely folded down from the cassette.
Figure 5:
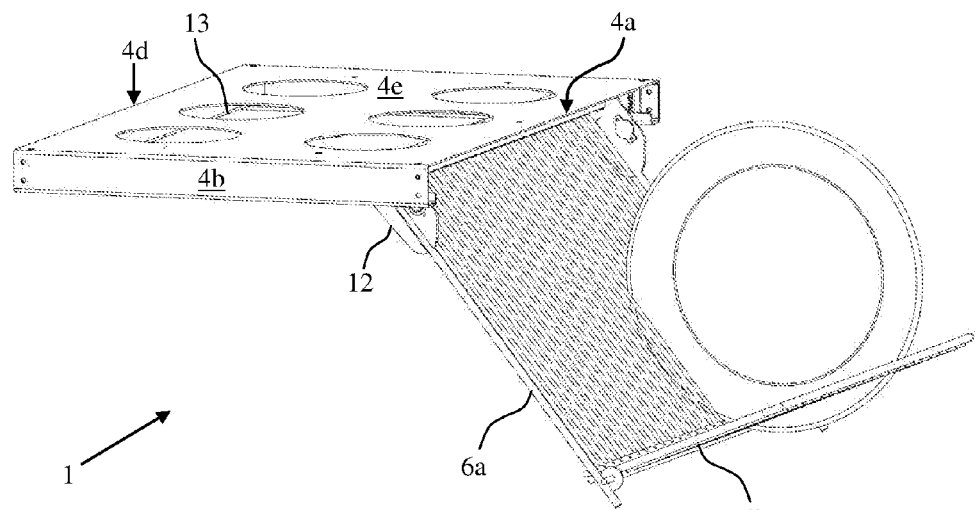
FIG. 5 illustrates the wire shelf completely pulled out and folded down from the cassette and with the second section of the wire shelf folded outwards and with a plate resting in the dish rack at the angle that arises between the first and second sections of the wire shelf to symbolically show the use of the dish rack.
Figure 6:
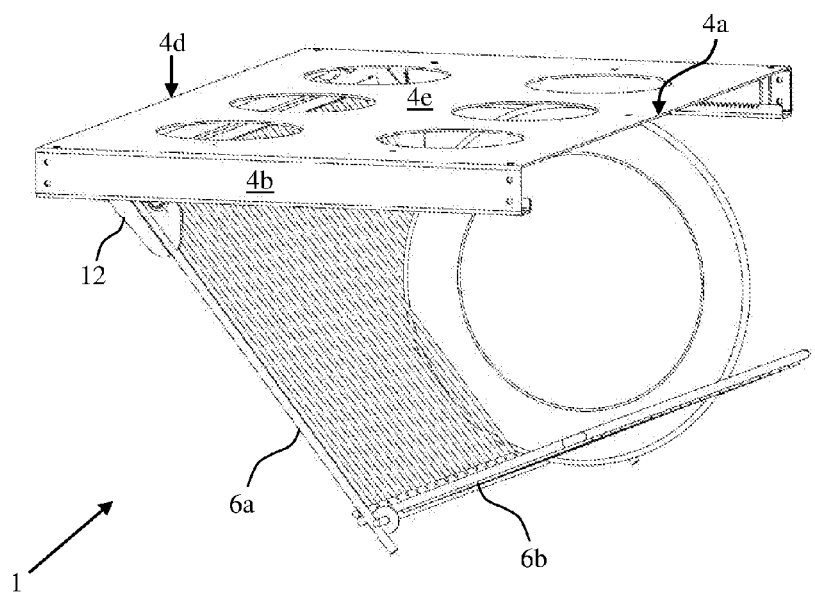
FIG. 6 shows the wire shelf in its folded-down position, corresponding to FIG. 5, but with the whole wire shelf and dishes received by the wire shelf completely pushed back, that is, the rear edge of the first section of the wire shelf is completely inserted into the cassette.

The figures show the dish rack 1 in its entirety. FIG. 1 shows a cassette 2 which encloses the wire shelf 3 in its entirety when the wire shelf is in its inserted position. The cassette 2 is open at its front edge, at 4a, to allow the movement of the wire shelf 3 into and out of the cassette 2. Further, the cassette 2 has two parallel sides 4b, 4c on either side of the inserted wire shelf 3. The upper side of the cassette 2 is covered by a plate or the like, which may be fully covering or may have openings according to the figure. The rear edge 4d of the cassette may be open or closed. In the downward direction in which the wire shelf 3 is folded, the cassette 2 is of course open in its entirely. Thus, the cassette 2 has no bottom. The cassette 2 is intended to be screwed to an underside of a cabinet, suitably a kitchen cabinet above a sink. The dish rack may, of course, be used in quite another location than in a kitchen, for example in laboratories or the like. The underside of a shelf may also be utilized as a point of attachment for the dish rack 1. The cassette 2 is connected to the underside of a cabinet/shelf, for example by means of screws or corresponding fixing elements, which are screwed through the upper side of the cassette. The openings according to the figure may be arranged to allow light fittings, for example spotlights, to be arranged above the cassette 2 at the shelf plane lying above, so that these openings allow light to pass through from these light fittings.

As is clear from the figures, the wire shelf 3 may be folded down from the cassette 2. In this folded-down position of the wire shelf, the wire shelf 3 is supported by the cassette at a rear edge 5 of the wire shelf by means of devices which will be described below. The wire shelf 3 is divided into two sections. A first section 6a of the wire shelf 3, in the fully folded-down position of the wire shelf, forms a first predetermined angle between 30 and 90 degrees, preferably 45 to 75 degrees, with respect to the upper side 4e of the cassette 2. A second section 6b of the wire shelf 3, when the wire shelf is recessed in the cassette, is folded towards the first section 6a. When the wire shelf 3 is folded down, the second section 6b of the wire shelf 3 may be folded outwards from the first section 6a at the front edge 7 of the first section 6a and forms a second predetermined angle within the range of 60 to 150 degrees, preferably 75 to 120 degrees, with respect to the plane of the first section 6a in a fully folded-out position.

The wire shelf 3 may, of course, be divided into more than two sections, for example three sections, where these are folded outwards and, for example, form a U-like shape as viewed in the horizontal plane perpendicular from the direction of pulling of the wire shelf 3. In such an embodiment, a third section shall be comprised by and considered as part of the section called the second section 6b in this description. Further, it is possible to equip the wire shelf with short sides in the form of a wire, a net, or the like, between the first section 6a and the second section 6b, so that dishes or articles cannot fall out of the dish rack in the lateral direction. These short sides are attached between the first section 6a and the second section 6b. In this connection, it should also be mentioned that the wire shelf 3, in an alternative embodiment, may be designed with a structure other than with parallel longitudinal wires. In this description, such other structures shall be comprised by the concept wire shelf.

Figure 7:
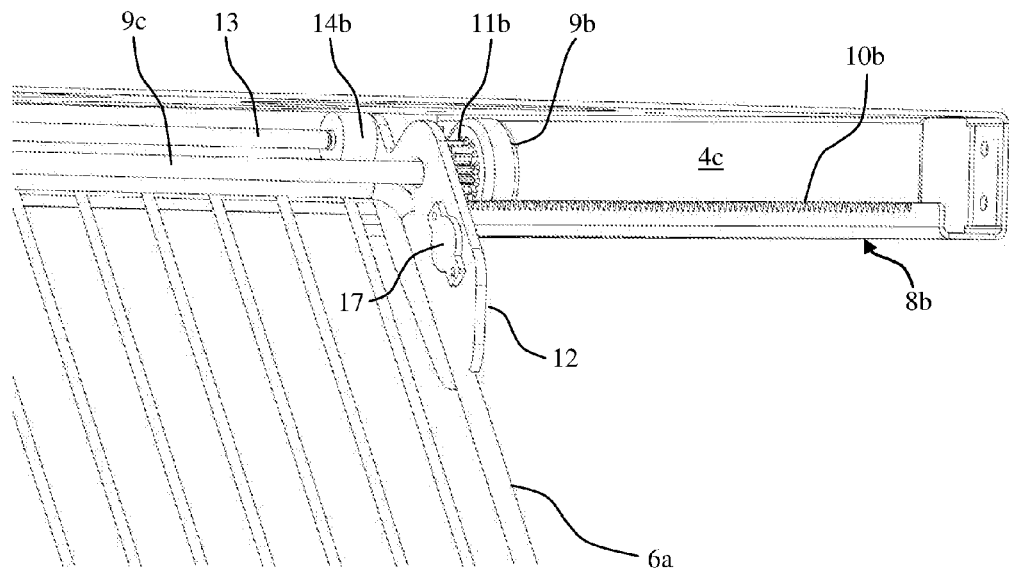
FIG. 7 shows a perspective partial view of the dish rack, where the arrangement for the suspension of the wire shelf in the cassette is presented.

The two parallel sides 4b, 4c of the cassette 2 along which the wire shelf 3 can be moved are equipped with longitudinal guide rails 8a, 8b, on which a first wheel set 9a, 9b (only the right-hand wheel of said wheel set being shown in FIG. 7), arranged in front of the rear edge of the wire shelf 3, is able to run. The wheels in the first wheel set are arranged at the respective ends of a front axle 9c.

The above-mentioned guide rails 8a, 8b comprise racks 10a, 10b extending along the sides 4b, 4c of the cassette. The wheels of said first wheel set 9a, 9b are integrated with toothed wheels 11a, 11b which cooperate with and correspond to teeth on said racks 10a, 10b. The advantage of using racks and toothed wheels is that the wheels in the front wheel set are forced to run synchronously with each other, whereby the front wheel set 9a, 9b moves the front axle 9c perpendicular to the direction of pulling, hence preventing the movement of the wire shelf from being jammed due to the so-called "jammed drawer effect".

Along the sides of the wire shelf 3, at its rear edge 5, the first section 6a of the wire shelf 3 is provided with at least two profiled members 12 arranged along the direction of pulling of the wire shelf 3, said members 12 having an extension 12a directed backwards, in which a rear axle 13 for rear wheels 14a, 14b (only the right-hand wheel 14b being shown in FIG. 7) is journalled and where said rear wheels 14a, 14b in a folded-down position of the wire shelf 3 run against an inner side of the upper side 4e of the cassette, and that the front axle 9c for said first wheel set 9a, 9b is journalled in a front part of said members 12.

The tilt angle of the first section 6a downwards and forwards of the wire shelf 3 is determined by the relative position between the journal of the rear axle 13 for said rear wheels 14a, 14b and the journal of the front axle 9c for the first wheel set 9a, 9b in said members 12.

In a folded-down position, the wire shelf 3 may be pushed into or pulled out from the cassette, whereby the weight of the wire shelf 3 is absorbed by the first wheel set 9a, 9b which, in a downward direction, loads and runs on the guide rails 8a, 8b, and by the rear wheels 14a 14b, which, in an upward direction, load and run against the inner side of the upper side of the cassette 2.

Figure 9:
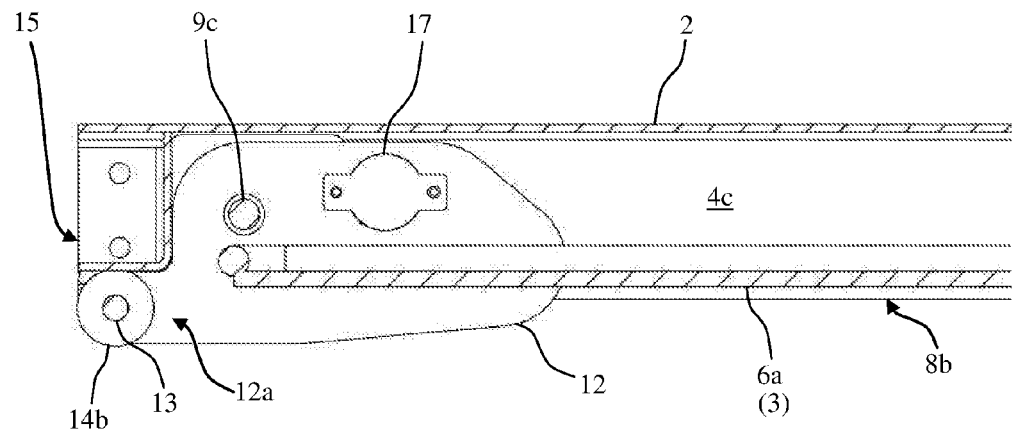
FIG. 9 shows the inner part of the wire shelf in a sectional view in the direction of pulling thereof, when the wire shelf is completely inserted and folded up.
Figure 10:
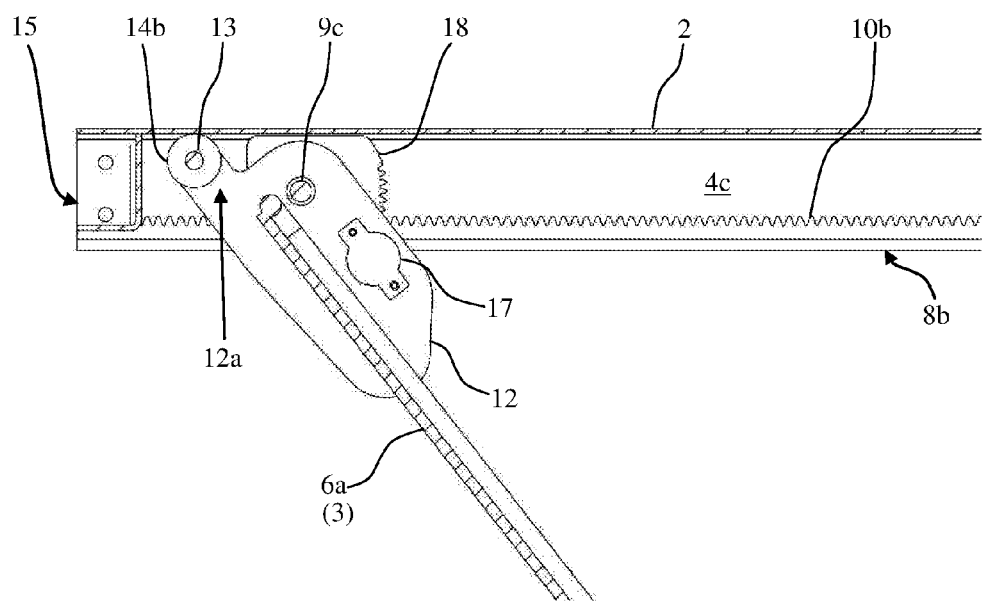
FIG. 10 shows the inner part of the wire shelf in a sectional view in the direction of pulling thereof, when the wire shelf is folded down.

When inserting the wire shelf 3, in a rear end position of the wire shelf 3, the rear wheels 14a, 14b pass a boss 15 so that the wire shelf 3 is pressed up by the boss 15 (see FIGS. 9 and 10) into an uppermost, horizontal position, and that the rear wheels 14a, 14b, when the shelf is slightly pulled out, are released from the boss 15, so that the wire shelf 3 falls down at a small angle (a few degrees) which is determined by a clearance between the rear wheels 14a, 14b and the upper surface of the cassette. Said clearance consists of the distance between the rear wheels 14a, 14b and the inner side of the upper side of the cassette 2, when the wire shelf 3 is held, by manual force, up against the cassette 2 (so that the wire shelf is not allowed to fall down at said small angle by its own force). Said small angle at which the wire shelf 3 is folded downward when being slightly pulled out, as mentioned above, is an advantageous function of the dish rack 1, in those cases where the dish rack is arranged under kitchen cabinet, for example, where the kitchen cabinet is provided with a strip under the front edge of the cabinet, that is, a strip that is often used to conceal light fittings or other equipment or, as in the current case, to conceal the dish rack 1 arranged under the cabinet. By using such a strip under the cabinet, the dish rack may be completely hidden when it is not in use. Only the lower part of a handle 16 which is fixed below the front edge of the wire shelf will be partly visible, so that the dish rack 1 can be localized, be folded downward at said small angle, pulled out of the cassette 2 under the strip, and be folded down completely for use.

A torque damper 17 with a wheel with a few teeth are arranged at the profiled member 12, so that these teeth when pulling out the wire shelf 3 from the cassette 2 make contact with an arm 18 with corresponding teeth, whereby the dropdown of the wire shelf 3 is damped by the torque damper 17. The arm 18 is attached to and suspended from the cassette 2 at the inner part of the cassette.

The first 6a and second 6b sections of the wire shelf 3 are provided with parallel wires, essentially aligned with each other, which run in the direction of pulling of the wire shelf 3.

As an alternative, instead of controlling the wire shelf by means of racks and toothed wheels to move completely perpendicularly to its direction of pulling, a cable is attached to the respective ends of an axle for the first wheel set, said cable being capable of being rolled out from a cable roller which keeps the cable stretched by means of a resilient device, thus preventing oblique motion of the wire shelf when said shelf is being pulled out and pushed in.

Figure 8:
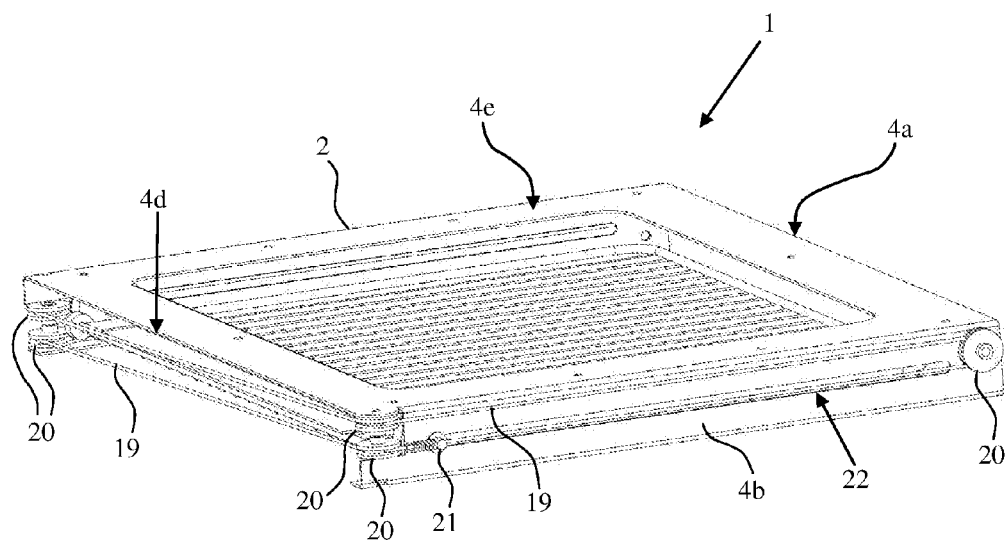
FIG. 8 illustrates an alternative solution for a dish rack according to the invention, in which a cable in an endless loop prevents locking of the wire shelf when pulling it out or pushing it in, which means that racks and toothed wheels according to a first alternative are not used.

As an alternative, instead of controlling the wire shelf by means of racks and toothed wheels to move completely perpendicularly to its direction of pulling, a cable 22 is attached to the respective ends 21 of the axle 9c for the first wheel set (see FIG. 8), said cable being arranged in an endless loop over rope sheaves 20. A resilient device (at 21) keeps the cable 22 stretched and thus prevents oblique motion of the wire shelf when being pulled out and pushed in, and thus the arrangement ensures that the wire shelf does not get locked against the cassette. As in the embodiment according to FIG. 8, the sheaves 20 may be in the form of a vertically mounted sheave at either end of the two sides of the cassette 2 at the front edge 4a and two wheels positioned horizontally above each other and mounted at the corners between the rear edge 4d of the cassette 2 and its two sides 4b and 4c. The cable 22 then runs in its endless loop over and around all the six sheaves 20, as illustrated in FIG. 8.

DEFINITION

In this description, the directional expressions forward and backward have been frequently used. The terms forward and forward direction shall mean the direction as viewed from the dish rack towards a user of the dish rack. Thus, the term forward/forward direction shall be seen as equivalent to the direction of pulling of the wire shelf 3. The terms back and backwards, respectively, shall mean the direction away from the user.

The invention claimed is:

1. A dish rack comprising: a cassette configured to be attached to the underside of a cabinet or a shelf, wherein the cassette comprises a foldable wire shelf having at least two sections, wherein the wire shelf is configured to move between a first position and a second position, wherein:
   in the first position, the wire shelf is folded and housed within the cassette and can be pulled out of and folded down from the cassette,
   in the second position, the wire shelf is in a folded-down position and the cassette supports a rear edge of a first section of the wire shelf so that the first section hangs down at a first predetermined angle relative to said underside, and a second section of the wire shelf is rotatably connected to the first section at a front edge thereof and capable of being folded outwards from the first section so that the second section, in folded-out state, forms a second predetermined angle to a plane through the first section,
   wherein the cassette at two parallel sides, along which sides the wire shelf can be moved, is equipped with two longitudinal guide rails on which a first wheel set arranged in front of the rear edge of the wire shelf is able to run.

2. The dish rack according to claim 1, wherein the sides of the wire shelf, at its rear edge of the first section of the wire shelf, are provided with at least two profiled members along the direction of pulling of the wire shelf, and wherein said members have a backwardly directed extension in which an axle for rear wheels is journalled and wherein said rear wheels in a folded-down position of the wire shelf run against an upper surface of the cassette, and that an axle for said first wheel set is journalled in a front part of said members.

3. The dish rack according to claim 2, wherein the tilt angle of the wire shelf downwards and forwards is determined by the relative position between the journal for the axle of said rear wheels and the journal for the axle of the first wheel set in said members.

4. The dish rack according to claim 3, wherein the wire shelf, in a folded-down position, may be inserted into or pulled out of the cassette, whereby the weight of the wire shelf is absorbed by the first wheel set which in a downward direction loads and runs on the guide rails and by the rear wheels which in an upward direction load and run against the upper surface of the cassette.

5. The dish rack according to claim 4, wherein the rear wheels, when the wire shelf is being pushed in at a rear end position for the wire shelf, pass a boss so that the wire shelf is kept by the boss in its uppermost position and wherein the rear wheels, when the wire shelf is being slightly pulled out, are released from the boss so that the wire shelf at the front edge of its first section falls down a short distance which is determined by a clearance between the rear wheels and the upper surface of the cassette.

6. The dish rack according to claim 5, wherein a torque damper comprising a wheel with a few teeth is arranged adjacent the profiled member so that these teeth, when the wire shelf is being pulled out, make contact with an arm with corresponding teeth, whereby the movement of the wire shelf, while being folded downwards, is damped by the torque damper.

7. The dish rack according to claim 6, wherein the first and second sections of the wire shelf are provided with parallel wires, essentially aligned with each other, which run in the direction of pulling of the wire shelf.

8. The dish rack according to claim 1, wherein said guide rails comprise racks and wherein the wheels on said wheel set are integrated with toothed wheels which cooperate with and correspond to teeth on said racks.

9. The dish rack according to claim 1, wherein a cable is fixed at the respective ends of an axle for the first wheel set and wherein said cable is arranged in an endless loop over sheaves arranged such that the wheels in the wheel set are forced to move synchronously, thus preventing oblique motion of the wire shelf when said shelf is being pulled out or pushed in.

10. The dish rack according to claim 1, wherein said first predetermined angle is between 35 and 90 degrees, and wherein said second predetermined angle is in a range of 60 to 150 degrees.

* * * * *